United States Patent [19]

Butler

[11] Patent Number: 4,774,310

[45] Date of Patent: Sep. 27, 1988

[54] METHOD FOR MAKING SILOXANE RESINS

[75] Inventor: Derek W. Butler, Barry, Wales

[73] Assignee: Dow Corning, Ltd., Barry, Wales

[21] Appl. No.: 61,759

[22] Filed: Jun. 15, 1987

[30] Foreign Application Priority Data

Jun. 28, 1986 [GB] United Kingdom ............... 8615862

[51] Int. Cl.$^4$ ..................... C08G 77/06; C08G 77/12
[52] U.S. Cl. .................................. 528/23; 528/12; 528/31; 528/43
[58] Field of Search ................. 528/12, 23, 31, 43

[56] References Cited

U.S. PATENT DOCUMENTS

| | | | |
|---|---|---|---|
| 2,676,182 | 4/1954 | Daudt | 528/39 |
| 2,857,356 | 10/1958 | Goodwin | 528/39 |
| 3,627,851 | 12/1971 | Brady | 260/825 |
| 3,772,247 | 11/1973 | Flannigan | 260/46.5 H |
| 4,310,678 | 1/1982 | Blizzard et al. | 556/451 |

FOREIGN PATENT DOCUMENTS 603076 6/1948 United Kingdom .
706719 4/1954 United Kingdom .
1418601 12/1976 United Kingdom .

Primary Examiner—John C. Bleutge
Assistant Examiner—R. Dean, Jr.
Attorney, Agent, or Firm—George A. Grindahl

[57] ABSTRACT

A method for making siloxane resins consisting essentially of tetravalent $SiO_2$ units and monovalent $R_3SiO_{0.5}$ and $H_aR_{3-a}SiO_{0.5}$ units wherein each R denotes an alkyl group or an aryl group having less than 9 carbon atoms and a denotes 1 or 2, comprises reacting in the presence of an acidic catalyst a siloxane resin consisting essentially of $R_3SiO_{0.5}$ units and $SiO_2$ units with $(H_aR_{3-a}Si)_2O$, where R and a are as defined above. Novel resins wherein only 0.1 to 30 percent of the monovalent units have SiH groups are also disclosed.

8 Claims, No Drawings

METHOD FOR MAKING SILOXANE RESINS

This invention is concerned with a method for making siloxane resins containing silicon-bonded hydrogen atoms and with certain novel siloxane resins of this type.

Siloxane resins consisting of triorganosiloxane units ($R_3SiO_{0.5}$) and $SiO_2$ units are known, commercially available materials and are employed in the formulation of silicone products such as adhesives and antifoams. Such resins are sometimes referred to as MQ resins in view of the presence of the monovalent (M) siloxane units and the quadrivalent or tetravalent (Q) $SiO_2$ units. Resins of this type wherein the organic groups are alkyl and processes for preparing such resins, are described for example in British Patent Specification Nos. 603 076 and 706 719.

In view of the reactivity of the $\equiv SiH$ group it is sometimes desired to include such groups in resins of the MQ type. British Patent Specification No. 1 418 601 discloses siloxane resins composed of $SiO_2$ units and units of the general formula $HR_2SiO_{0.5}$ wherein R represents hydrogen or a monovalent hydrocarbon or halohydrocarbon group. Also disclosed in the said Patent Specification is the use of such resins for the manufacture of organopolysiloxane elastomers. In the resins of Specification No. 1 418 601 each of the M units must contain one silicon-bonded hydrogen atom. For certain applications, however, for example when the resins are employed as reactants in chemical synthesis, it is desirable that they contain limited and predetermined amounts of $\equiv SiH$ groups. U.S. patent specification No. 3 772 247 discloses organopolysiloxane resins consisting of $R'_3SiO_{0.5}$ units, $SiO_2$ units and units of the type $HR'SiO$ and/or $HSiO_{1.5}$ in which $R'$ represents a monovalent hydrocarbon group selected from the group consisting of alkyl, aryl, aralkyl, alkaryl, alkenyl, cycloalkyl or cycloalkenyl groups. Although such resins have $\equiv SiH$ groups they differ from MQ resins inasmuch as they have a significant content of divalent (HRSiO) and/or trivalent ($HSiO_{1.5}$) units.

According to the present invention there is provided a novel method for making siloxane resins consisting essentially of tetravalent $SiO_2$ units and monovalent $R_3SiO_{0.5}$ and $H_aR_{3-a}SiO_{0.5}$ units, wherein each R is selected from the group consisting of alkyl and aryl groups having less than 9 carbon atoms and a denotes 1 or 2, which comprises reacting in the presence of an acidic catalyst a siloxane resin consisting essentially of $R_3SiO_{0.5}$ units and $SiO_2$ units, with $(H_aR_{3-a}Si)_2O$ where R and a are as defined above.

Siloxane resins consisting essentially of $R_3SiO_{0.5}$ units and $SiO_2$ units wherein R is as defined above suitable for use in the process of the invention are MQ type siloxane resins. Preferably the ratio of monovalent units (M) to tetravalent units (Q) is in the range of 0.4:1 to 2:1. Suitable siloxane resins for use in the process of this invention may be liquids or solids. For example when R is methyl and the M to Q ratio is above 1:1 the resin is a liquid at ambient temperature, having a viscosity at 25° C. which ranges from about 100 mm$^2$/s for the higher ratios to more than 0.1 m$^2$/s around the 1:1 ratio. When the M to Q ratio drops to below about 1:1 for those resins where R is methyl a solid resin is obtained. Some of these solid resins have a melting point which may be as high as 150° C. Other resins sublimate. Most preferred are MQ resins where the M/Q ratio is in the range of 0.4:1 to 1:1. As stated hereinabove MQ resins are known materials and methods for preparing them have been described, for example, in G.B. Patent Specifications Nos. 603 076 and 706 719. MQ resins which may be used in the process according to the invention may have up to about 5% by weight $\equiv SiOH$ and/or $\equiv SiOR$ groups.

According to the method of this invention, the MQ siloxane resins are reacted with disiloxanes of the general formula $(H_aR_{3-a}Si)_2O$, and a being as defined above. Preferably the disiloxane reactants are those of the formula $(HR_2Si)_2O$, those wherein R is methyl being particularly preferred.

The reaction between the siloxane resin and the disiloxane $(H_aR_{3-a}Si)_2O$ is carried out in the presence of an acidic catalyst. Equilibration catalysts, such as trifluoromethane sulphonic acid are particularly useful. Other acidic catalysts, such as for example HCl, $H_2SO_4$, supported acid catalysts and paratoluene sulphonic acid will however also work. The catalyst is used in an amount which will range typically from about 0.1 to about 1% by weight based on the weight of the two reagents. The reaction is carried out at elevated temperatures. These temperatures may vary depending on the catalyst used. When for example trifluoromethane sulphonic acid is used as a catalyst, a reaction temperature in the range from 60° C. to 90° C. is preferably employed. Where high molecular weight solid MQ resins, having a melting point which is higher than the intended reaction temperature, are used a small amount of solvent is preferably added to give a more uniform reaction mixture.

The reaction may generally be carried out by mixing the reagents and the catalyst, and heating the mixture. Following the reaction the catalyst is preferably inactivated, using any suitable technique, for example neutralisation with $NaHCO_3$. The reaction may be carried out in the absence of solvent. It may, however, be preferred to use a solvent such as for example toluene, in order to improve the compatibility of the reagents.

The preferred MQ siloxane resins made by the process of this invention have a ratio of monovalent units to tetravalent units of from about 0.4:1 to about 2:1. For applications requiring resins in the higher range of molecular weights, a ratio of M/Q of from 0.4:1 to 1:1 is preferred.

The method of this invention enables the preparation of resins of the MQ type having a predetermined content of $\equiv SiH$ groups. The process of the invention is particularly useful for making MQ type siloxane resins having relatively small proportions of $H_aR_{3-a}SiO_{0.5}$ units. Preferably from 0.1 to 30 percent of the total number of monovalent units have the general formula $H_aR_{3-a}SiO_{0.5}$. Such MQ resins are believed to be novel. Therefore in a further aspect the invention provides siloxane resins consisting essentially of $R_3SiO_{0.5}$ units, $SiO_2$ units and $H_aR_{3-a}SiO_{0.5}$ units, characterised in that from 0.1 to 30 percent of the total number of monovalent units in the siloxane resins have the general formula $H_aR_{3-a}SiO_{0.5}$. Most preferred are those resins where less than 10% of the monovalent groups have $\equiv SiH$ functionality. MQ resins made according to the process of the invention may have up to 5% by weight groups of the formula $\equiv SiOH$ and $\equiv SiOR$. These groups may result from incomplete hydrolysis and condensation during the preparation of the MQ resins.

MQ resins obtained by the process of the invention may be used for example in the synthesis of siloxane molecules, employing the reactivity of SiH groups in reactions with organic and organosilicon substances having e.g. olefinic unsaturation, ≡SiOH or ≡Si-alkenyl functionality.

The following examples, where all parts and percentages are expressed by weight, unless otherwise indicated, and where Me denotes a methyl group, illustrate the invention.

Preparation of MQ Resins

A first MQ resin was prepared by adding to a flask 129.6g (0.8 mole) hexamethyldisiloxane, 40g hydrochloric acid, 30g absolute ethanol and 60g distilled water. The mixture was agitated and heated to about 70° to 80° C. and 208.3g tetraethoxysilane was added dropwise over a period of about 60 minutes. The temperature was increased and maintained at 75° to 80° C. for about 30 minutes after completion of the addition. The product was then separated using distilled water and toluene. The toluene/siloxane phase was neutralised and dried over NaHCO$_3$ and MgSO$_4$. The liquor was filtered and the solvent removed under reduced pressure at 130° C. After cooling 172.5g the first MQ resin was recovered (91% of theory). This MQ resin was analysed and had a molecular weight of 881, a viscosity of 554 mm$^2$/s and a ratio of M/Q units of 1.6:1, 0.26 percent residual SiOH and 1.98 percent residual SiOCH$_2$CH$_3$ were found.

A second MQ resin was prepared in the same way except that only 72.9g of hexamethyldisiloxane was added and some toluene was added to aid mobility. 120g of the second MQ resin was obtained having an average ratio of M/Q units of 0.9:1.

A third MQ resin was prepared in the same way as the first except that only 56.7g of hexamethyldisiloxane was used, some toluene was added to aid mobility, the addition and reaction time were extended to 2 hours and the final product was not distilled or analysed.

EXAMPLE 1

125.8g of the first MQ resin was charged to a 500 cm$^3$ 3-neck flask to which a condenser, agitator and thermocouple were fitted. The flask was previously flushed with nitrogen and had a nitrogen blanket over the mixture. 17.4g of tetramethyldisiloxane (Me$_2$HSi)$_2$O was added to the flask. This mixture was heated with stirring to 33° C. and 0.72g trifluoromethane sulphonic acid was added along with 0.07g of distilled water. The mixture was heated to about 80° C. for 6 hours. Then the mixture was cooled to 62° C. and the acid catalyst precipitated by the addition of dimethylformamide. The mixture was maintained at that temperature for a further one hour, cooled to room temperature and 10g NaHCO$_3$ was added. The product was then filtered and stripped at 128° C. under reduced pressure of 10mm Hg. 77.9g of resin was recovered along with 22.1g of volatile components. IR analysis showed an absorption band at 2160 cm$^{-1}$, typical of SiH. Chemical analysis showed 6.18 percent SiH based on the total resin. The theoretical amount of SiH expected was 5.9% (percentage based on the total resin).

EXAMPLE 2

120.0g of the second MQ resin was charged to a flask as described in Example 1. 5.65g of tetramethyldisiloxane (Me$_2$HSi)$_2$O was added to the flask. This mixture was heated with stirring to 46° C. and 0.58g trifluoromethane sulphonic acid added together with 0.06g of distilled water. The mixture was heated to about 77° C. for 6 hours, cooled to 50° C. and the acid catalyst precipitated by the addition of dimethylformamide. The mixture was maintained at that temperature for a further one hour and then cooled to room temperature when 10g NaHCO$_3$ was added. The product was filtered and stripped at 40° C. under reduced pressure of 10mm Hg. to yield 108.4g of resin. IR analysis showed an absorption band at 2160 cm$^{-1}$, typical of SiH. Chemical analysis showed 1.04 percent SiH based on the total resin.

EXAMPLE 3

To 120g of the second MQ resin 13.4g of tetramethyldisiloxane was added and the mixture was heated to 60° C., when 0.2g of p-toluene sulphonic acid was added. After four hours at about 92° C. the mixture was cooled to room temperature. The sulphonic acid was neutralised with sodium bicarbonate and filtered out. The reaction product was stripped on a rotary evaporator to 100° C. at reduced pressure to remove toluene and volatiles. 89.4g of a gum like material was recovered which was shown by infrared analysis to contain 1.70 percent SiH groups.

EXAMPLE 4

The third MQ resin was charged to a flask as described in Example 1, together with 6.7g tetramethyldisiloxane. The mixture was heated to 45° C. and 0.33g trifluoromethylsulphonic acid was added together with 0.03g of distilled water. The mixture was heated and held at about 97° C. for 4 hours after which it was cooled to 60° C. and the acid neutralised with dimethylformamide. When the remaining product had cooled to room temperature 20g of NaHCO$_3$ was added and the mixture filtered to give a crystal clear liquid. This was stripped of volatiles at 100° C. to yield 83.5g of a solid resin which was shown by infrared analysis to contain 2.6 percent of SiH.

EXAMPLE 5

83g of a MQ resin having a M/Q ratio of 1.3:1 was mixed with 13.4g of tetramethyldisiloxane, 0.96g of a supported acid clay catalyst and some toluene to aid the mobility of the mixture. The mixture was heated to reflux at about 100° C. for 5 hours. It was then allowed to cool to room temperature and filtered. The clear liquid which was obtained was stripped at 100° C. to yield 88.5g of a liquid resin which was shown by infrared to contain 2.52 percent SiH.

That which is claimed is:

1. A method for making siloxane resins consisting essentially of tetravalent SiO$_2$ units and monovalent R$_3$SiO$_{0.5}$ and H$_a$R$_{3-a}$SiO$_{0.5}$ units, wherein each R is selected from the group consisting of alkyl and aryl groups having less than 9 carbon atoms and a denotes 1 or 2, which comprises reacting in the presence of an acidic catalyst a siloxane resin consisting essentially of R$_3$SiO$_{0.5}$ units and SiO$_2$ units, with (H$_a$R$_{3-a}$Si)$_2$O where R and a are as defined above.

2. A method according to claim 1 wherein the ratio of monovalent to tetravalent units in the siloxane resin consisting essentially of R$_3$SiO$_{0.5}$ units and SiO$_2$ units is from 0.4:1 to 2:1.

3. A method according to claim 2 wherein the ratio of monovalent to tetravalent units is from 0.4:1 to 1:1.

4. A method according to claims 1, 2 or 3 wherein the acidic catalyst is trifluoro- methane sulphonic acid.

5. A method according to claim 1 when carried out in the presence of a solvent.

6. A method according to claim 1 wherein R is methyl.

7. A method according to claim 1 wherein a has a value of 1.

8. A siloxane resin consisting essentially of tetravalent $SiO_2$ units and monovalent $R_3SiO_{0.5}$ and $H_aR_{3-a}SiO_{0.5}$ units wherein each R is selected from the group consisting of alkyl and aryl groups having less than 9 carbons and a denotes 1 or 2, wherein the $H_aR_{3-a}SiO_{0.5}$ units comprise from 0.1% to 30% of the total number of monovalent units present, and the ratio of said monovalent units to said tetravalent units has a value of from 0.4:1 to 2:1.

* * * * *